Aug. 10, 1926.
H. C. BENNIE
1,595,138
TRANSMISSION DRIVE FOR FORD SPEEDOMETERS
Filed March 10, 1924
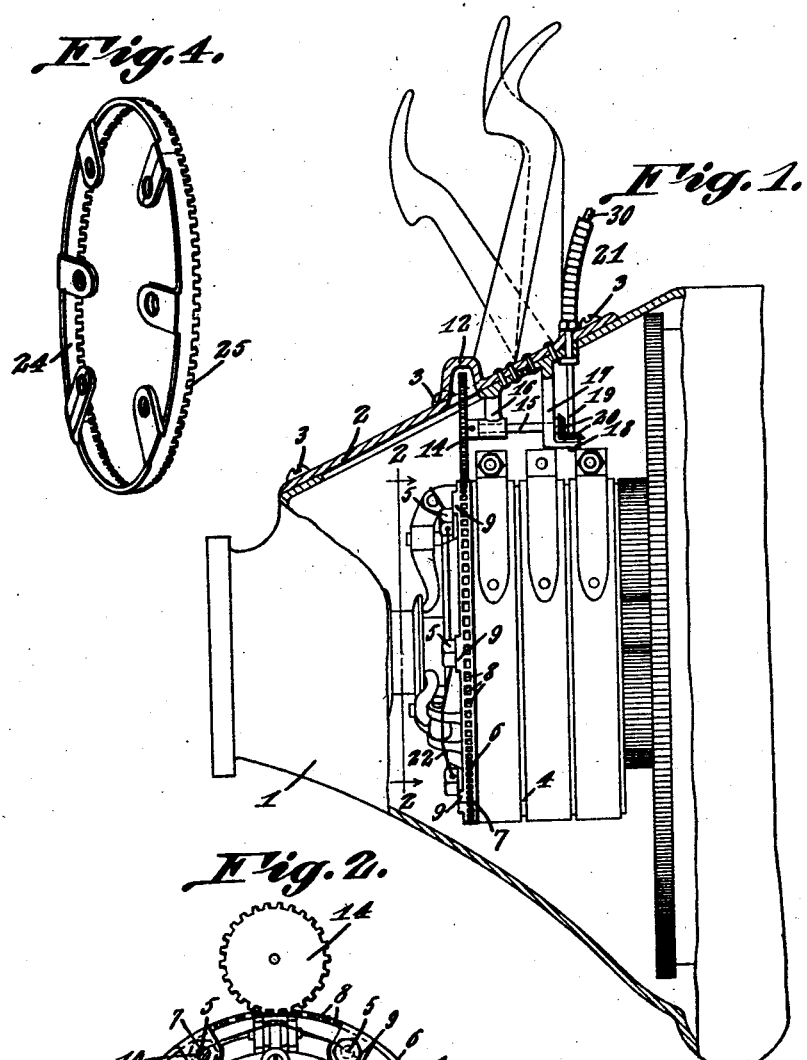
Inventor
H.C. Bennie,
By C. A. Snow & Co.
Attorneys Patented Aug. 10, 1926.

1,595,138

UNITED STATES PATENT OFFICE.

HAROLD C. BENNIE, OF ALMENA, KANSAS.

TRANSMISSION DRIVE FOR FORD SPEEDOMETERS.

Application filed March 10, 1924. Serial No. 698,175.

This invention aims to provide means whereby a speedometer on a Ford car may be operated from within the transmission casing, it being a matter of common knowledge that the practice of driving a speedometer from one of the front wheels is fraught with many disadvantages.

It is within the province of the disclosure, to improve generally and to enhance the utility of, devices of that type to which the invention appertains.

Although a preferred embodiment of the invention has been shown in the drawings, it will be understood, that within the scope of what is claimed, a mechanic may make changes in the structure delineated and described, without departing from the spirit of the invention.

In the accompanying drawings:—

Figure 1 shows in side elevation, a device constructed in accordance with the invention, parts of the casing being broken away; Fig. 2 is an end elevation wherein parts are broken away; Fig. 3 is an elevation showing a slight modification; and Fig. 4 is an elevation showing another modification.

Referring to the drawings, the numeral 1 denotes the transmission casing of a Ford car, a cover 2 being held on the casing 1 by securing elements 3. The numeral 4 designates a rotatable member in the transmission casing, preferably the brake drum. The rotatable member 4 carries removable studs 5. A gear ring 6 surrounds the rotatable member 4, and for the sake of convenient assembly, may be fashioned in two parts, as shown at 7. The gear ring 6 has openings 8, located entirely within the gear ring, the gear ring being provided with ears 9, overlapped on the rear surface of the rotatable member. The ears having openings 10, through which the studs 5 pass, to hold the gear ring 6 on the member 4 for rotation therewith. The transmission cover 2 has an offset 12, defining a recess.

A pinion 14 meshes with the openings 8 in the gear ring 6, and extends into the recess formed by the offset 12. The pinion 14 is mounted on a shaft 15 journaled in bearings 16 and 17, the bearing 17 being located in advance of the bearing 16, and having a rectangularly disposed foot 18. The bearings 16 and 17 are mounted on the transmission cover 2.

A second shaft 19 is located at right angles to the shaft 15. The shaft 19 is journaled in the foot 18 of the bearing 17 and in the transmission cover 2. Any suitable means may be provided for connecting the shafts 15 and 19 operatively. In the form shown in Fig. 1, but not of necessity, the shafts 15 and 19 are connected by beveled pinions 20. The shaft 19 drives the flexible shaft 30 of the speedometer, the shaft 30 being located within the usual tubular guard 21, attached to the transmission cover 2. One of the advantages of the device is that when the cover 2 is removed, all of the driving mechanism, excepting the gear ring 6, is removed. Since the gear ring 6 is split as shown at 7, the gear ring may be mounted readily on the rotatable member 4. In order to hold the studs 5 in place against rotation, a securing means 22, such as a wire, may be run through the heads of the studs, the ends of the wire being twisted together, or joined otherwise, as shown at 23, in Fig. 2.

When the member 4 is rotated, the gear ring 6 and the pinion 14 will drive the shaft 15, motion being transmitted from the shaft 15 to the shaft 19 through the instrumentality of the beveled gears 20 or their equivalent, and, from the shaft 19, rotation is imparted to the speedometer shaft 30.

It is not necessary that the gear ring be provided with the openings 8. In Fig. 4, the gear ring 24 is constructed as hereinbefore described, aside from the fact that this gear ring has teeth 25 in one edge the teeth being adapted to cooperate with such a part as the pinion 14.

In Fig. 3, the bearing corresponding to the bearing 17 is marked by the numeral 50, the shaft 27 representing the shaft 19 and the shaft 28 representing the shaft 15. In this form of the invention, an operative connection between the shafts 27 and 28 is effected through the instrumentality of a worm wheel 51 on the shaft 27, and a worm 29 on the shaft 28, Figure 3 making it evident that the shafts may be connected in any way suitable.

Having thus described the invention, what is claimed is:—

In a device of the class described, a transmission case having an opening, a detachable cover for the opening, a depending rear bearing secured to the cover, a depending forward bearing located in front of the rear bearing and secured to the cover, the forward bearing being supplied at its lower end with a transverse projecting foot, a horizontal first shaft journaled in the bearings, a vertical second shaft journaled in the foot and in the upper portion of the forward bearing, intermeshing gear members connected to the shafts, the gear member on the vertical shaft resting on the foot, and the gear member on the horizontal shaft being located between the second shaft and the forward bearing, a rotatable member within the case, and intermeshing gears secured respectively to the rotatable member and to the first shaft.

In testimony that I claim the foregoing as my own, I have hereto affixed my signature.

HAROLD C. BENNIE.